United States Patent
Fujimura

(10) Patent No.: US 12,088,520 B2
(45) Date of Patent: Sep. 10, 2024

(54) USER DEVICE AND COMMUNICATION METHOD

(71) Applicant: NTT DOCOMO, INC., Tokyo (JP)

(72) Inventor: Naoki Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 382 days.

(21) Appl. No.: 17/606,600

(22) PCT Filed: May 1, 2019

(86) PCT No.: PCT/JP2019/018178
§ 371 (c)(1),
(2) Date: Oct. 26, 2021

(87) PCT Pub. No.: WO2020/222269
PCT Pub. Date: Nov. 5, 2020

(65) Prior Publication Data
US 2022/0239432 A1    Jul. 28, 2022

(51) Int. Cl.
*H04L 5/00*     (2006.01)
*H04B 7/0408*   (2017.01)
*H04B 7/06*     (2006.01)

(52) U.S. Cl.
CPC ......... *H04L 5/0048* (2013.01); *H04B 7/0408* (2013.01); *H04B 7/0695* (2013.01)

(58) Field of Classification Search
CPC .. H04B 7/0408; H04B 7/0413; H04B 7/0695; H04B 7/088; H04B 17/373; H04L 5/0048; H04L 5/005
USPC ......................................... 370/252, 329, 336
See application file for complete search history.

(56) References Cited

U.S. PATENT DOCUMENTS

2021/0184733 A1* 6/2021 Cao ..................... H04B 7/0639
2021/0391899 A1* 12/2021 Cao ..................... H04B 17/373

OTHER PUBLICATIONS

International Search Report issued in PCT/JP2019/018178 on Dec. 10, 2019 (3 pages).

(Continued)

*Primary Examiner* — Harun Chowdhury

(57) ABSTRACT

A user device includes a receiver configured to receive, from a base station, a signal containing one or more transmission configuration indication information items; and a controller configured to determine whether an assumption of a QCL (Quasi-Co-Location) relationship between a first signal and a second signal is valid, based on the one or more transmission configuration indication information items, wherein the controller performs an operation with respect to the first signal in accordance with a result of the determination.

6 Claims, 17 Drawing Sheets

(56) References Cited

OTHER PUBLICATIONS

Written Opinion of the International Searching Authority issued in PCT/JP2019/018178 on Dec. 10, 2019 (3 pages).
3GPP TS 38.133 V15.4.0; "3rd Generation Partnership Project; Technical Specification Group Radio Access Network; NR; Requirements for support of radio resource management (Release 15)"; Dec. 2018 (876 pages).
3GPP TS 38.214 V15.4.0; "3rd Generation Partnership Project; Technical Specification Group Radio Access Network; NR; Physical layer procedures for data (Release 15)"; Dec. 2018 (102 pages).
Office Action in the counterpart Chinese Application No. 201980095853.9, mailed Jun. 29, 2023 (19 pages).
Office Action in the counterpart Japanese Application No. 2021-517137, mailed May 30, 2023 (4 pages).
Ericsson: "Maintenance for RS and QCL", 3GPP TSG-RAN WG1 Meeting #94, Tdoc R1-1809198, Goteborg, Sweden, Aug. 20-24, 2018 (6 pages).

* cited by examiner

FIG.2

| QCL Types | QCL parameters |
|---|---|
| A | Doppler shift, Doppler spread, average delay, delay spread |
| B | Doppler shift, Doppler spread |
| C | Average delay, Doppler shift |
| D | Spatial Rx parameter (sQCL) |

UE knows the RX beam to receive source RS.
UE uses the same RX beam to receive target RS.

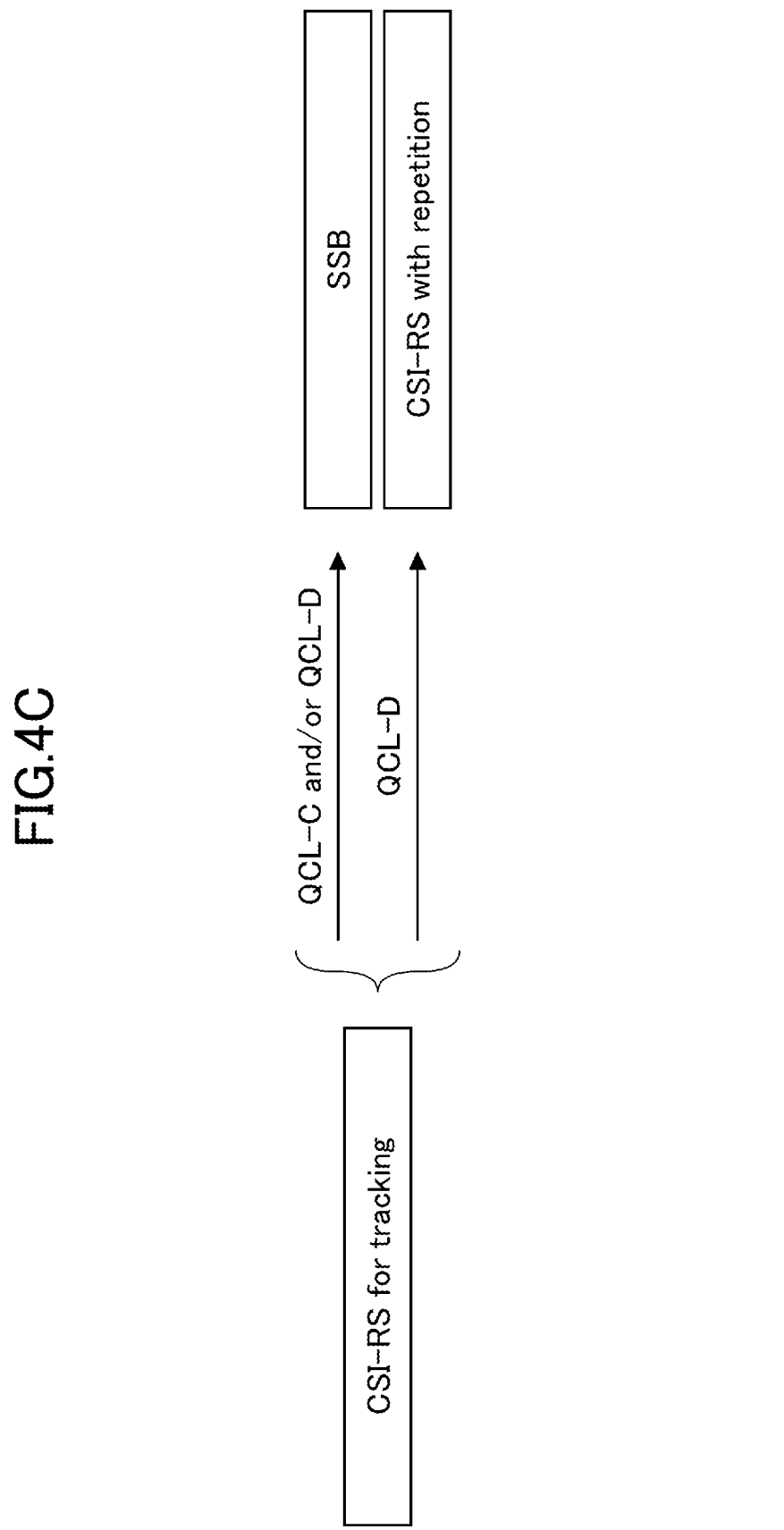

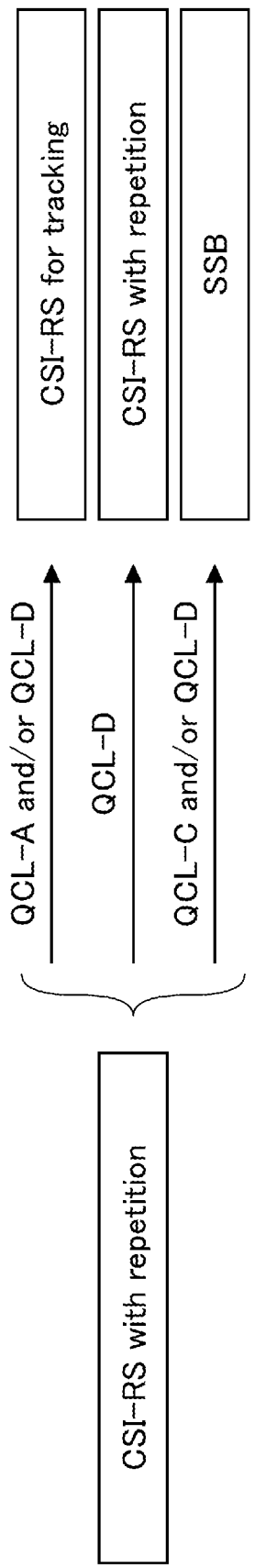

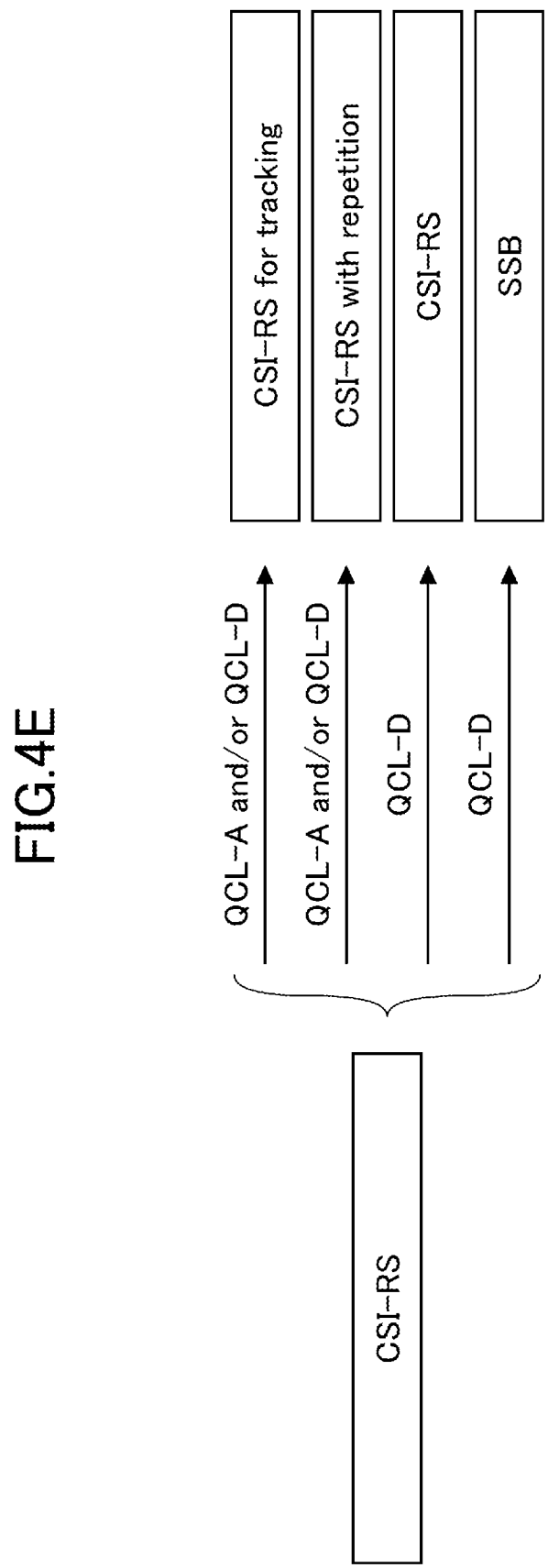

USER DEVICE AND COMMUNICATION METHOD

TECHNICAL FIELD

The present invention relates to a user device and a communication method in a radio communication system.

BACKGROUND ART

In New Radio (NR), beamforming is applied upon transmission of data in a Physical Downlink Shared Channel (PDSCH), transmission of control signals in a Physical Downlink Control Channel (PDCCH), transmission of synchronization signals and broadcast information in the Synchronization Signal/Physical Broadcast Channel (SS/PBCH) Block (SSB), and transmission of reference signals (Channel State Information Signal (CSI-RS)/Demodulation Reference Signal (DMRS) in order to acquire coverage for secure communications using high-frequency radio waves.

Beam management or beam control is important to perform communications using a beam. For example, if there are two beams, a base station needs to inform a user device which beam is being used to transmit a signal. In order to inform a user device of a beam to be used, or in order to inform a user device of beam switching to be used, a Transmission Configuration Indication (TCI) state is defined.

RELATED ART DOCUMENTS

Non-Patent Documents

[Non-Patent Document 1] 3GPP TS 38.214 V15.4.0 (2018-12)
[Non-Patent Document 2] 3GPP TS 38.133 V15.4.0 (2018-12)

SUMMARY OF THE INVENTION

Problem to be Solved by the Invention

The content of TCI state to be indicated includes Quasi-Co-Location (QCL) indication. The QCL indication indicates that one physical channel or reference signal (RS) may be assumed to be the same radio channel (or to have the same radio properties) as another reference signal. (Non-Patent Document 1).

If a physical channel or reference signal (QCL target) is assumed to be Quasi-Co-Located with another reference signal (QCL source), it is considered possible not only to designate (configure) another signal directly as a QCL source but also to designate (configure) another signal indirectly as a QCL source. However, it is not clearly specified (defined) what kind of designation (configuration) is applied to make one physical channel or reference signal Quasi-Co-Located with another reference signal.

The present invention has been made in view of the above-described point, and is intended to provide a technology to clarify what designation (configuration) has been made to make one physical channel or reference signal Quasi-Co-Located with another reference signal in a radio communication system.

Means for Solving the Problem

According to an aspect of the present invention, a user device is provided. The user device includes:

a receiver configured to receive, from a base station, a signal containing one or more transmission configuration indication information items; and
a controller configured to determine whether an assumption of a QCL (Quasi-Co-Location) relationship between a first signal and a second signal is valid, based on the one or more transmission configuration indication information items,
wherein the controller performs an operation with respect to the first signal in accordance with a result of the determination.

According to an aspect of the present invention, a communication method performed by a user device is provided. The communication method includes:

receiving, from a base station, a signal containing one or more transmission configuration indication information items;
determining whether an assumption of a QCL (Quasi-Co-Location) relationship between a first signal and a second signal is valid, based on the one or more transmission configuration indication information items; and
performing an operation with respect to the first signal in accordance with a result of the determination.

Advantageous Effect of the Present Invention

An aspect of embodiments provides a technology for clarifying what type of designation (configuration) is made to make one physical channel or reference signal Quasi-Co-Located with another reference signal.

BRIEF DESCRIPTION OF THE DRAWINGS

FIG. 2 is a diagram illustrating an example of each of QCL types.
FIG. 4C is a diagram illustrating examples of QCL relationships.
FIG. 4D is a diagram illustrating examples of QCL relationships.
FIG. 4E is a diagram illustrating examples of QCL relationships.

EMBODIMENTS FOR CARRYING OUT THE INVENTION

Figure 1:
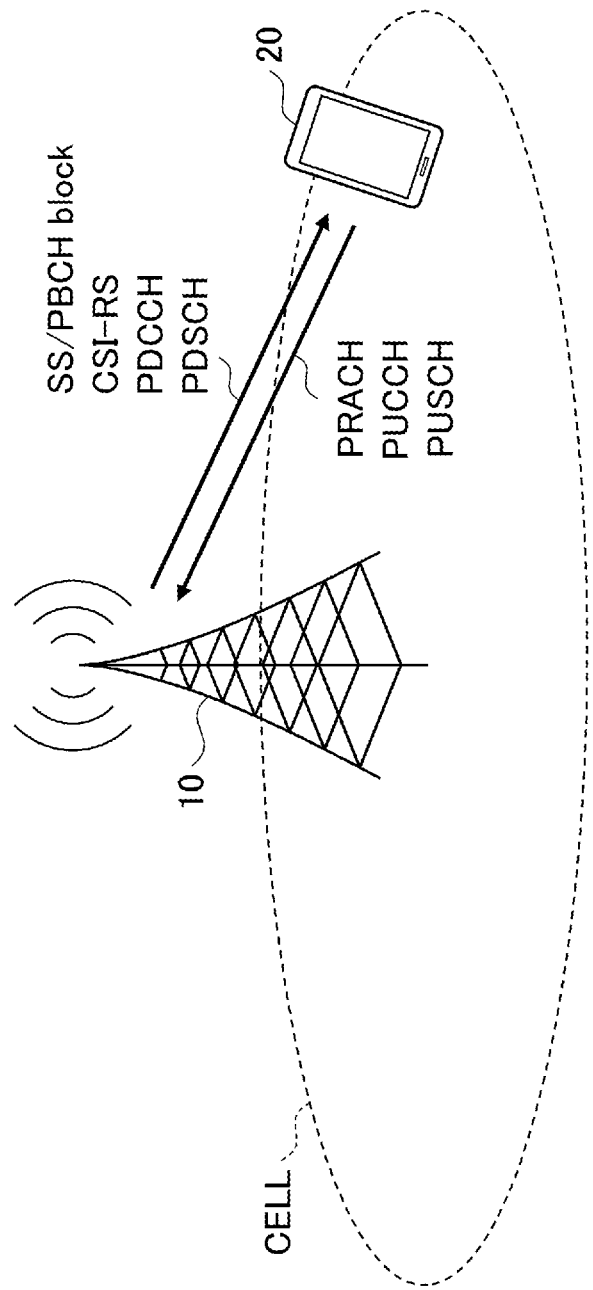
FIG. 1 is a configuration diagram illustrating a communication system according to the present embodiment.

Hereinafter, embodiments of the present invention will be described with reference to the accompanying drawings. The embodiments described below are merely examples, and the embodiments to which the present invention is applied are not limited to the following embodiments.

Embodiments of the Present Invention described below use terms such as a synchronization signal (SS), a primary SS (PSS), a secondary SS (SSS), a physical broadcast channel (PBCH), a physical random access channel (PRACH), and the like, used in the conventional LTEs. These terms are used for convenience of simplified illustration, and other names may be referred to by as similar signals, functions, and the like. The above terms in NR may correspond to NR-SS, NR-PSS, NR-SSS, NR-PBCH, NR-PRACH, and the like. However, signals used for NR are not necessarily defined with "NR-".

Also, in the embodiments of the present invention, a duplex mode may be a time division duplex (TDD) mode, may be a frequency division duplex (FDD) mode, or may be another mode (such as flexible duplex).

Also, in the following description, transmitting a signal by using a transmission beam may be performed by digital beamforming, which includes transmitting a signal multiplied by a precoding vector (a signal pre-coded by a precoding vector). Also, transmitting a signal by using a transmission beam may be performed by analog beamforming, which includes implementing beamforming using variable phase shifters inside the RF (Radio Frequency) circuits. Similarly, receiving a signal by using a reception beam may be performed by digital beamforming, which includes multiplying a received signal by a predetermined weight vector. Also, receiving a signal by using a reception beam may be performed by analog beamforming, which includes implementing beamforming using variable phase shifters inside the RF circuits. Further, transmitting a signal by using a transmission beam and receiving a signal by using a reception beam may each be performed by hybrid beamforming, which combines digital beamforming and analog beamforming. Also, transmitting a signal by using a transmission beam may include transmitting a signal through a specific antenna port. Similarly, receiving a signal by using a reception beam may include receiving a signal through a specific antenna port. An antenna port refers to a logical antenna port or a physical antenna port defined in the 3GPP standards. The precoding or beamforming may also be referred to as a precoder or a spatial domain filter or the like.

A method of forming a transmission beam and a method of forming a reception beam are not particularly specified. For example, in a base station 10 or a user device 20, including a plurality of antennas, a method for changing each antenna angle may be used, a method for using a precoding vector may be used in combination with the method for changing each antenna angle, a method for switching between different antenna panels may be used, a method for using a plurality of antenna panels may be used, or other methods may be used. Further, for example, in a high-frequency band, a plurality of different transmission beams may be used. An operation that uses a plurality of transmission beams is referred to as a multi-beam operation. An operation that uses a single transmission beam is referred to as a multi-beam operation.

Also, in embodiments of the present invention, to "configure" a radio parameter or the like may indicate to pre-configure a predetermined value, or to configure a radio parameter informed by a base station 10 or a user device 20.

FIG. 1 is a diagram illustrating a radio communication system according to an embodiment of the present invention. The radio communication system according to an embodiment of the present invention includes a base station 10 and a user device 20, as illustrated in FIG. 1. In the radio communication system in FIG. 1, one base station 10 and one user device 20 are illustrated; however, the illustrated radio communication system is merely an example. The radio communication system illustrated in FIG. 1 may include one or more base stations 10 and one or more user devices 20.

The base station 10 is a communication device configured to provide one or more cells. The base station 10 is a communication device configured to perform radio communication with the user device 20. Physical resources of radio signals are defined in a time domain and a frequency domain. The time domain may be defined by OFDM symbol numbers, and the frequency domain may be defined by sub-carriers or resource blocks. The base station 10 transmits synchronization signals and system information to the user device 20. The synchronization signals are, for example, NR-PSS and NR-SSS. Part of the system information is also called broadcast information. The broadcast information is transmitted, for example, by NR-PBCH. The synchronization signal and broadcast information may be periodically transmitted as an SS block (SS/PBCH block). The SS block (SS/PBCH block) is composed of a predetermined number of OFDM symbols. For example, the base station 10 transmits a DL (Downlink) control signal or data to the user device 20, and receives an UL (Uplink) control signal or data from the user device 20. Both the base station 10 and the user device 20 are capable of beamforming to transmit and receive signals. For example, as illustrated in FIG. 1, a reference signal transmitted from the base station 10 includes a CSI-RS (Channel State Information Reference Signal), and channels transmitted from the base station 10 include PDCCH (Physical Downlink Control Channel) and PDSCH (Physical Downlink Shared Channel).

The user device 20 is a communication device having a radio communication function. Examples of the user device 20 include a smartphone, a cellular phone, a tablet, a wearable terminal, a communication module for M2M (Machine-to-Machine), or the like. The user device 20 utilizes various communication services provided from a radio communication system by receiving a DL control signal or data from the base station 10, and by transmitting an UL control signal or data to the base station 10. For example, as illustrated in FIG. 1, channels transmitted from the user device 20 include PUCCH (Physical Uplink Control Channel) and PUSCH (Physical Uplink Shared Channel).

In the New Radio (NR), in order to acquire coverage for secure communications using high-frequency radio waves, beamforming is applied upon transmission of data in the Physical Downlink Shared Channel (PDSCH), transmission of a control signal in the Physical Downlink Control Channel (PDCCH), transmission of a synchronization signal and broadcast information in the Synchronization Signal/Physical Broadcast Channel (SS/PBCH) Block (SSB), and transmission of a reference signal (Channel State Information Signal (CSI-RS)/Demodulation Reference Signal (DMRS).

For example, in Frequency Range 2 (FR2), i.e., the frequency band of millimeter waves greater than and equal to 24 GHz, 64 beams may be used. In Frequency Range 1 (FR1), i.e., the sub-6 GHz frequency band, 8 beams may be used.

Beam management or beam control is important for performing communications using a beam. For example, if there are two beams, the base station 10 may need to indicate, to the user device 20, which beam is being used to transmit a signal. A Transmission Configuration Indication (TCI) state is defined for indicating, to the user device 20, a beam to be used or for indicating, to the user device 20, beam switching to be used.

The content of the TCI state to be indicated includes Quasi-Co-Location (QCL) information. The Quasi-Co-Location (QCL) information indicates that one physical channel or reference signal (RS) can be assumed to be the same radio channel (or to have the same radio properties) as another reference signal.

For example, to establish a QCL relationship between a reference signal such as CSI-RS (or SS/PBCH) and a channel for transmitting data such as PDSCH means that the reference signal and the data have a relationship in which the reference signal and the data are transmitted by using the same beam.

As illustrated in FIG. 2, four QCL types of A to D are defined according to QCL parameters that can be identified as identical (Non-Patent Document 1). In particular, since the NR allows for multi-beam communication between the base station 10 and the user device 20, a QCL type D has been introduced as a QCL relationship. The QCL type D indicates that a spatial Rx parameter is the same between one physical channel or reference signal and another reference signal.

In NR, a Transmission Configuration Indication (TCI) state (TCI-state) is defined in order to indicate from a network to the user device 20 that it is possible to assume a QCL relationship (QCL assumption). For example, a TCI-state is used to indicate which SSB and/or CSI-RS resource is to be referred to as a QCL source for PDSCH (PDSCH-DMRS), PDCCH (PDCCH-DMRS), and CSI-RS.

Figure 3:
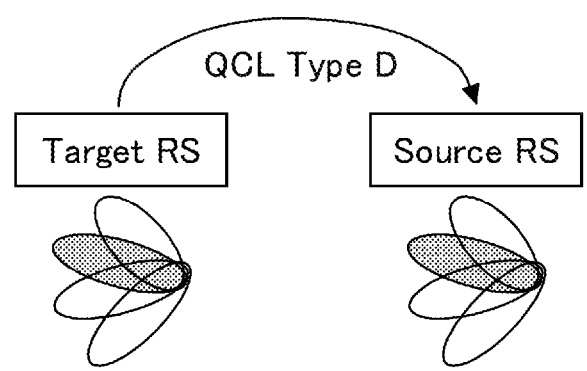
FIG. 3 is a diagram illustrating an example of each of a QCL target and a QCL source.

FIG. 3 is a diagram illustrating an example of each of a QCL target and a QCL source. For example, as illustrated in FIG. 3, it is possible to make a QCL Type D relationship assumption between one reference signal (target RS) and another reference signal (source RS), and a reception beam (Rx beam) for receiving the source RS is known to the user device 20. In this case, the user device 20 may be able to receive a target RS using the same reception beam (Rx beam) for receiving the source RS.

Four QCL types from A to D are defined in accordance with QCL parameters that can be identified as identical (Non-Patent Document 1).

Specifically, if a QCL Type D relationship is configured with respect to a combination of one physical channel or reference signal and another reference signal, it is possible to assume that the user device 20 may use the same reception beam (Rx beam) with respect to one physical channel or reference signal and another reference signal, which established the QCL Type D relationship.

Note that Non-patent Document 2 provides a specification that defines a QCL Type D relationship between one reference signal and a signal to which beam sweeping has been applied, as a condition that does not require reception beam sweeping executed by the user device 20. The reception beam sweeping executed by the user device 20 in this case is used for measuring one reference signal or the like in order to perform beam management and radio link monitoring (RLM).

FIGS. 4A, 4B, 4C, 4D, and 4E illustrate typical examples of QCL relationships.

Figure 4A:
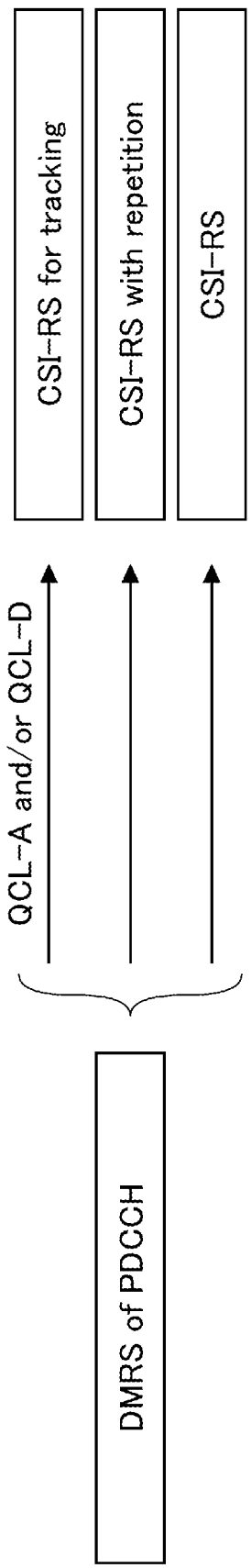
FIG. 4A is a diagram illustrating examples of QCL relationships.
Figure 4B:
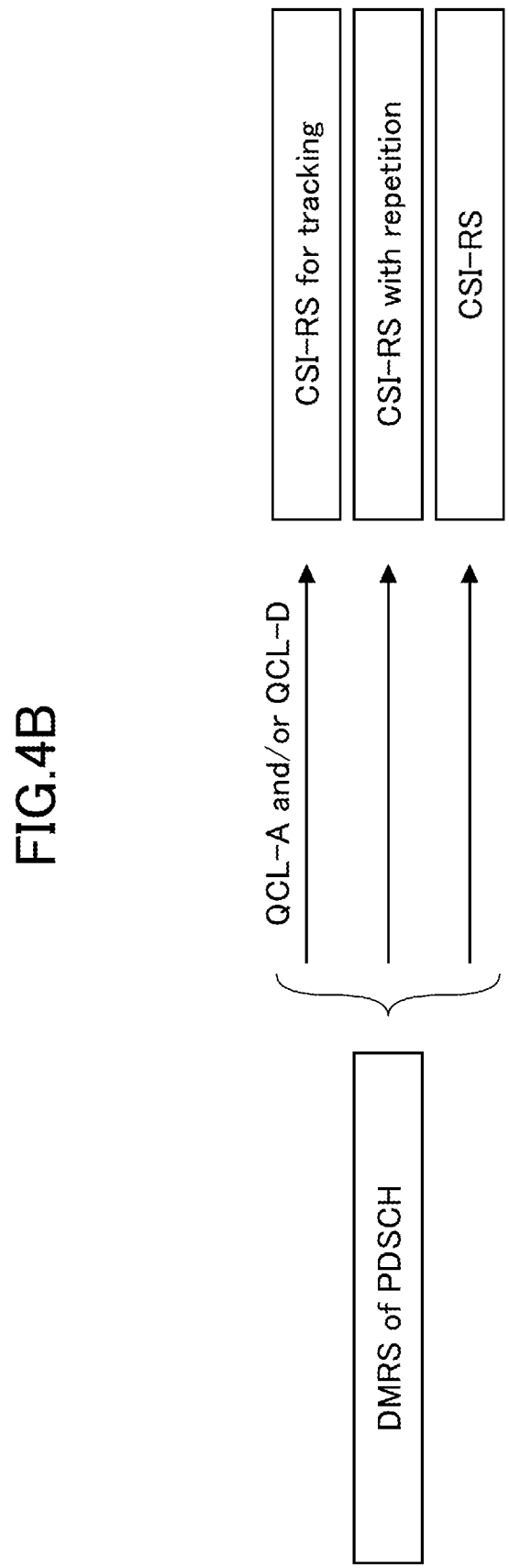
FIG. 4B is a diagram illustrating examples of QCL relationships.

In each of FIGS. 4A, 4B, 4C, 4D, and 4E, the QCL target is illustrated on the left side, the QCL source is illustrated on the right side, and each QCL relationship type is illustrated by an arrow between the QCL target and the QCL source. For example, the top row of FIG. 4A illustrates an example of a QCL Type A relationship and/or a QCL Type D relationship between "DMRS of PDCCH" as QCL target and "CSI-RS for tracking" as QCL source. Also, the middle row of FIG. 4A illustrates an example of a QCL Type A relationship and/or a QCL Type D relationship between "DMRS of PDCCH" and "CSI-RS with repetition". Likewise, the bottom row of FIG. 4A illustrates an example of a QCL Type A relationship and/or a QCL Type D relationship between "DMRS of PDCCH" and "CSI-RS".

PROBLEM TO BE SOLVED

Figure 5:
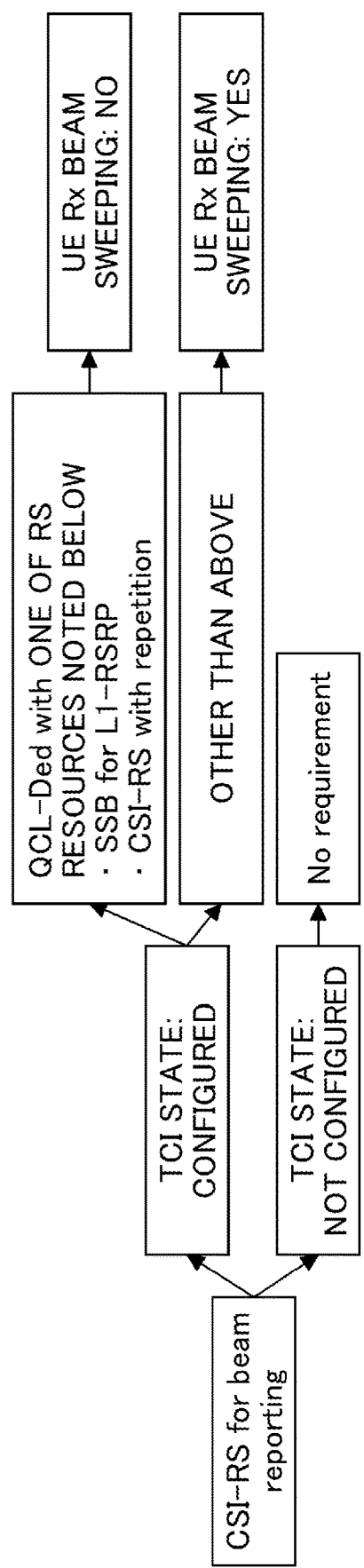
FIG. 5 is a diagram illustrating a problem to be solved.

FIG. 5 is a diagram illustrating a problem to be solved. In FIG. 5, an example of reporting of a CSI-RS-based L1-RSRP (Reference Signal Received Power) is illustrated. As described above, the QCL Type D relationship is defined between the CSI-RS and a predetermined signal, as a condition that does not require reception beam sweeping upon performing measurement using the CSI-RS signal.

Further, when resources used for reference signal measurement and resources used for the PDCCH/PDSCH (control signal/data) are allocated to the same OFDM symbol (TDM), the QCL Type D relationship is defined between the resources for the PDCCH/PDSCH and the resources for the reference signal, as a condition for simultaneously receiving resources used for reference signal measurement and resources used for the control signal/data.

Designating (configuring) the QCL type D relationship between a target signal and a source signal may include direct and indirect designations. In other words, the QCL source may be designated directly or indirectly. However, conditions and types of relationships to be applied to the conditions are not clearly defined.

For example, in order to designate (configure) the QCL Type D relationship between "CSI-RS (1)" and "SSB", "SSB" may be designated, as a QCL source for "CSI-RS (1)", directly (e.g. "CSI-RS (1)"→"SSB"), or may be designated, as a QCL source, indirectly (e.g. "CSI-RS (1)"→"CSI-RS (2)"→"SSB").

If only direct designations are determined to be valid, indirect designations, which can be used in actual operation, are determined to be invalid. In this case, unnecessary reception of beam sweeping would be required, thereby resulting in excessive delays and deterioration of system performance.

If indirect designations are determined to be valid unconditionally, the user device 20 would need to repeatedly read a plurality of TCI states that are used for indirect designations, thereby resulting in an increase in a load on the user device 20.

OBJECT

The present embodiments take into account appropriate measurements/reception conditions, and processing load reduction in the user device 20. Thus, it is an object in one or more embodiments of the present invention to clearly define whether an assumption of a QCL relationship (QCL assumption) is valid or invalid, and also to define an operation of the user device 20 in accordance with the valid or invalid assumption. As a result, it is possible to maintain optimal network control and stable communication between a base station 10 and a user device 20 without increasing processing load on the user device 20.

Embodiments

Embodiments of the present invention may provide a condition for determining whether a QCL assumption is valid or invalid, and change an operation of the user device 20 in accordance with a result of the determination.

The QCL relationship assumption (QCL assumption) may be at least one of Type A, Type B, Type C, Type D, or a newly defined QCL type for indicating other QCL parameters, or may be a combination of Type A, Type B, Type C, Type D, and the newly defined QCL type.

As a condition to determine whether an assumption of a QCL (QCL assumption) is valid or invalid, the following conditions (1), (2), and (3) may be applied for example.

(1) A condition as to whether a synchronization/reference signal is directly designated as a QCL source may be applied.

(2) A condition as to whether a specific combination of TCI state configurations is used may be applied.

(3) A condition as to whether a predetermined number of TCI state configuration sets or less is used may be applied, where the predetermined number of TCI state configuration combinations or less being counted from a predetermined synchronization/reference signal or PDCCH/PDSCH as a starting point.

To change an operation of the user device 20 may indicate to change a specific operation described in the technical specifications, or may indicate to change a specified value applied to the operation of the user device 20. For example, the operation of the user device 20 may be changed, as noted in the following (1), (2), (3), (4), and (5).

(1) To change an operation by changing whether the user device 20 executes the reception beam sweeping or not.

(2) To change an operation by changing whether the user device 20 additionally performs a specific measurement operation (e.g., L1-RSRP reporting (beam quality reporting)) or not.

(3) To change an operation by changing whether the user device 20 can receive data/control channel and other reference signals simultaneously or not.

(4) To change an operation by applying the definitions in the technical specifications only when an assumption of the QCL relationship (QCL assumption) is valid (i.e., when the QCL assumption is invalid, the user device 20 need not perform an operation in accordance with the definitions in the technical specifications).

(5) To change an operation by changing definitions of a time (e.g., delay time) required to perform a desired operation.

(Conditions for Determining Whether QCL Assumption is Valid/Invalid)

Figure 6:
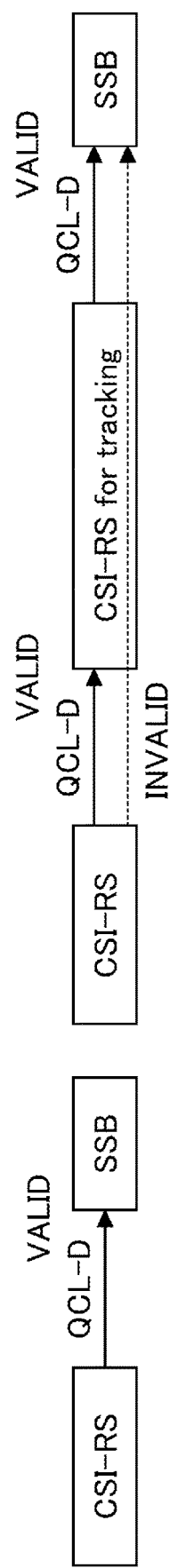
FIG. 6 is a diagram illustrating examples of a condition (1).

For example, as a condition to determine whether a QCL assumption is valid/invalid, a condition as to whether a synchronization/reference signal is directly designated as a QCL source (e.g., whether the synchronization/reference signal is included in the QCL-info) may be used. FIG. 6 is a diagram illustrating examples of such a condition (1). As illustrated in FIG. 6, a QCL assumption may be determined to be valid only when a synchronization/reference signal is designated directly as the QCL source in the TCI state.

Figure 7:
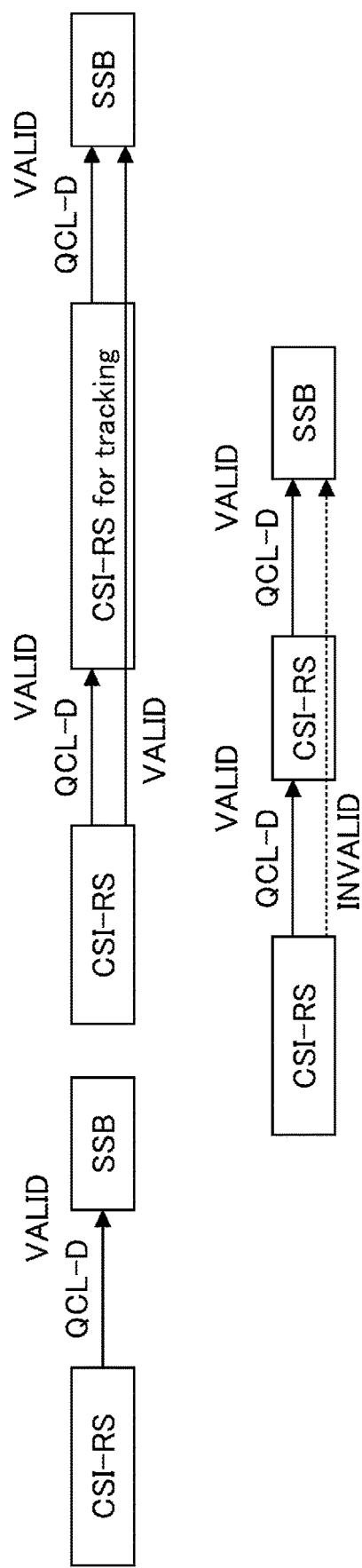
FIG. 7 is a diagram illustrating examples of a condition (2).

As a condition to determine whether a QCL assumption is valid/invalid, for example, the QCL assumption may be valid only when a specific combination(s) of TCI states (configurations) is designated. FIG. 7 is a diagram illustrating examples of such a condition (2). As illustrated in FIG. 7, the QCL assumption may be determined to be valid only when a synchronization/reference signal is designated directly as QCL source or only when a synchronization/reference signal is designated indirectly as QCL source via "CSI-RS for tracking". The QCL assumption may, for example, be determined to be invalid when a synchronization/reference signal is designated indirectly via "CSI-RS", as illustrated in a lower part of FIG. 7. Note that the designated combination(s) of TCI states may also be changed according to desired operations to be performed by the user device 20 on a per desired operation basis; or the designated combination(s) of TCI states may remain unchanged regardless of operations to be performed by the user device 20.

As a condition to determine whether a QCL assumption is valid/invalid, a condition in which a predetermined number of TCI state configuration combinations or less may be used, where the predetermined number of TCI state configuration combinations or less being counted from a synchronization/reference signal or PDCCH/PDSCH as a starting point.

For example, as a condition to determine that a QCL assumption is valid, a condition in which an X number of TCI state configuration combinations or less may be used, where one reference signal may be used as a QCL source, and the X number of TCI state configuration combinations or less may be counted from the one reference signal as a starting point. In this case, one reference signal may be any one of "SSB", "CSI-RS for tracking", CSI-RS with repetition", and other CSI-RS (CSI-RS other than "CSI-RS for tracking", and "CSI-RS with repetition"), or one or more combinations of these signals. The value of "X" may be, for example, two or any other value.

Likewise, as a condition to determine that a QCL assumption is valid, a condition in which a Y number of TCI state configuration combinations or less may be used, where the PDCCH or PDSCH may be used as a QCL target, and the Y number of TCI state configuration combinations or less is counted backward from the PDCH or PDSCH as a starting point. Note that the value of "Y" may be, for example, two or any other value. The combinations of the TCI state configurations where the PDCCH/PDSCH acts as the QCL target may indicate the combinations of TCI state configurations that are only used for determining that the QCL assumption is valid.

Figure 8:
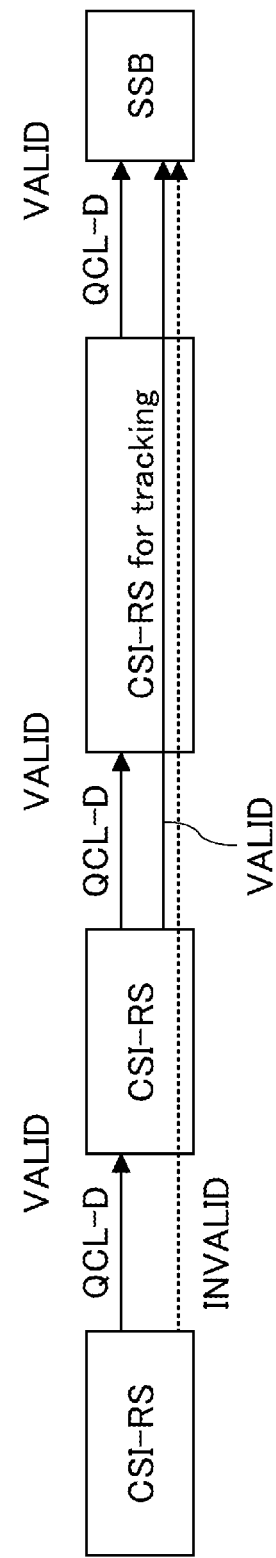
FIG. 8 is a diagram illustrating an example of a condition (3)
Figure 9:
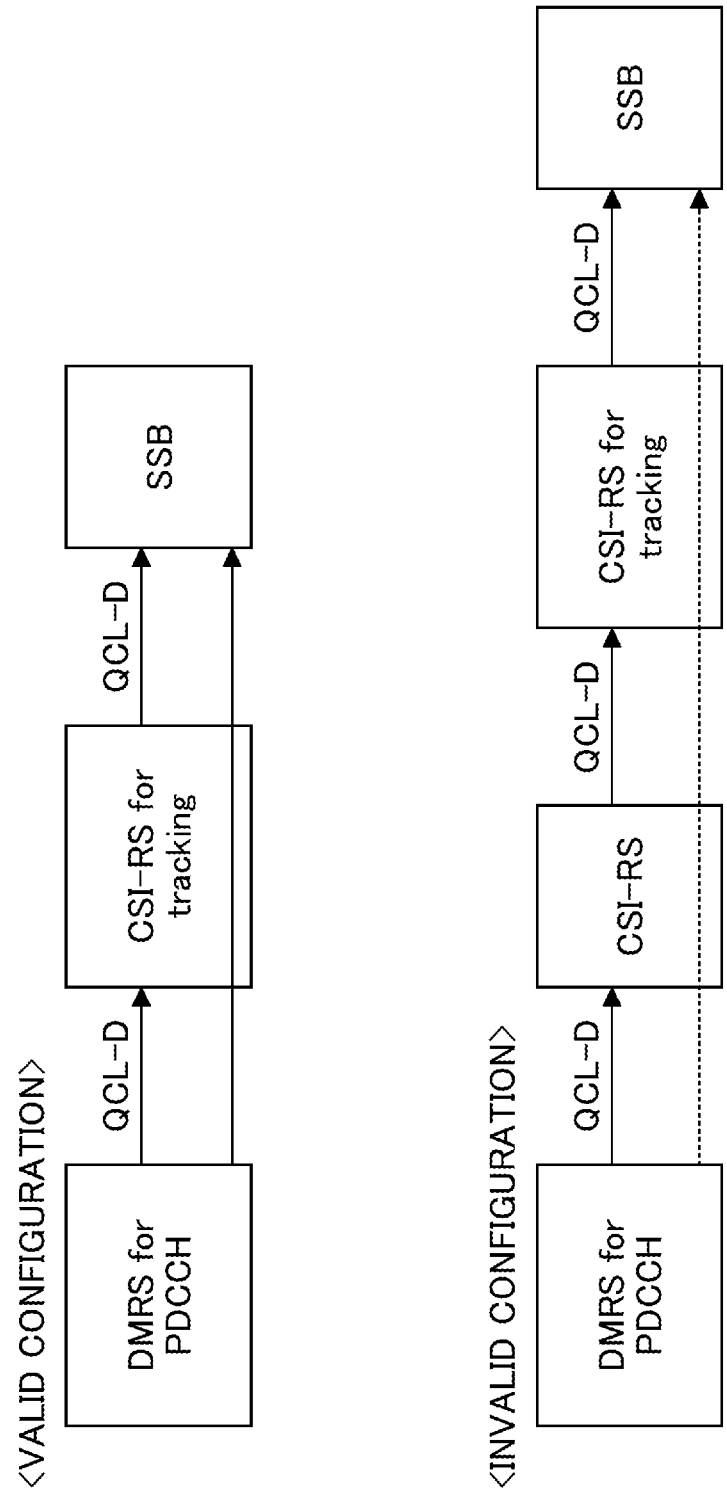
FIG. 9 is a diagram illustrating another example of the condition (3).

FIGS. 8 and 9 are diagrams illustrating examples of such a condition (3). FIG. 8 illustrates an example of the condition (3) in which two or less of TCI state configuration combinations are used for determining that a QCL assumption is valid, where the SSB acts as a QCL source, and the two or less of TCI state configuration combinations are counted from the SSB as a starting point. FIG. 9 illustrates another example of the condition (3) in which two or less of TCI state configuration combinations are used for determining that a QCL assumption is valid, where the PDCCH acts as a QCL target, and the two or less of TCI state configuration combinations are counted backward from the PDCCH as a starting point.

(Different Operations According to Whether QCL Assumptions are Valid or Invalid)

Specific operations, which may differ according to results of whether respective QCL assumptions are valid or invalid, may include, for example, L1-RSRP reporting, RLM, BFD (Beam Failure Detection), CBD (Candidate Beam Detection), reception beam sweeping, or transmission/reception of data/control signals.

Figure 10:
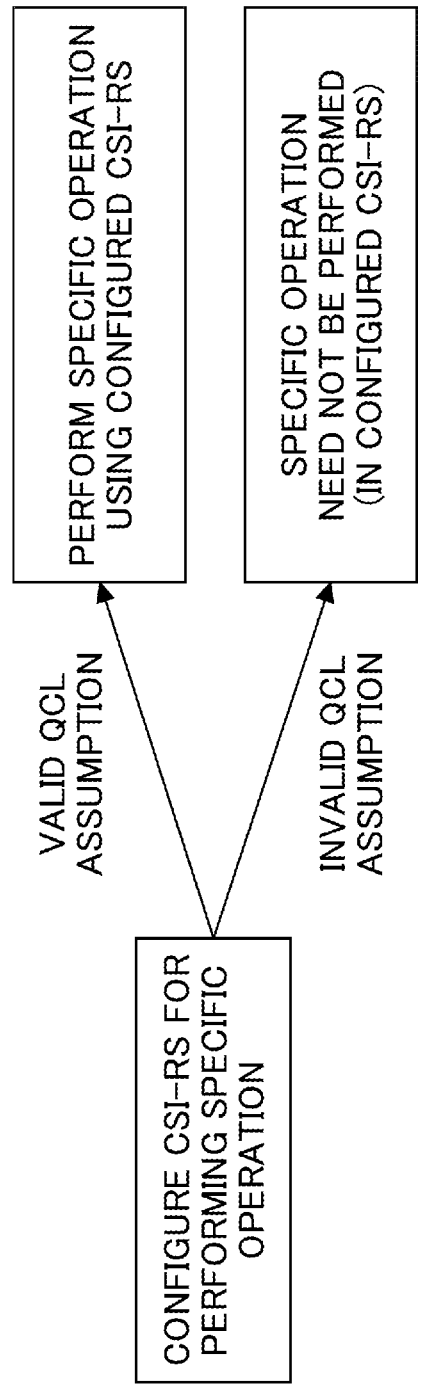
FIG. 10 is a diagram illustrating examples of different operations (1).

FIG. 10 is a diagram illustrating examples of different operations (1).

FIG. 10 illustrates an example of performing different operations according to respective results of whether the QCL assumption is valid or invalid as follows. When a CSI-RS for performing a specific operation is configured, and a QCL assumption between the configured CSI-RS and the QCL source is determined to be valid, a specific operation is performed using the configured CSI-RS. When the QCL assumption between the configured CSI-RS and the QCL source is determined to be invalid, a specific operation is not required to be performed (in the configured CSI-RS).

Figure 11:
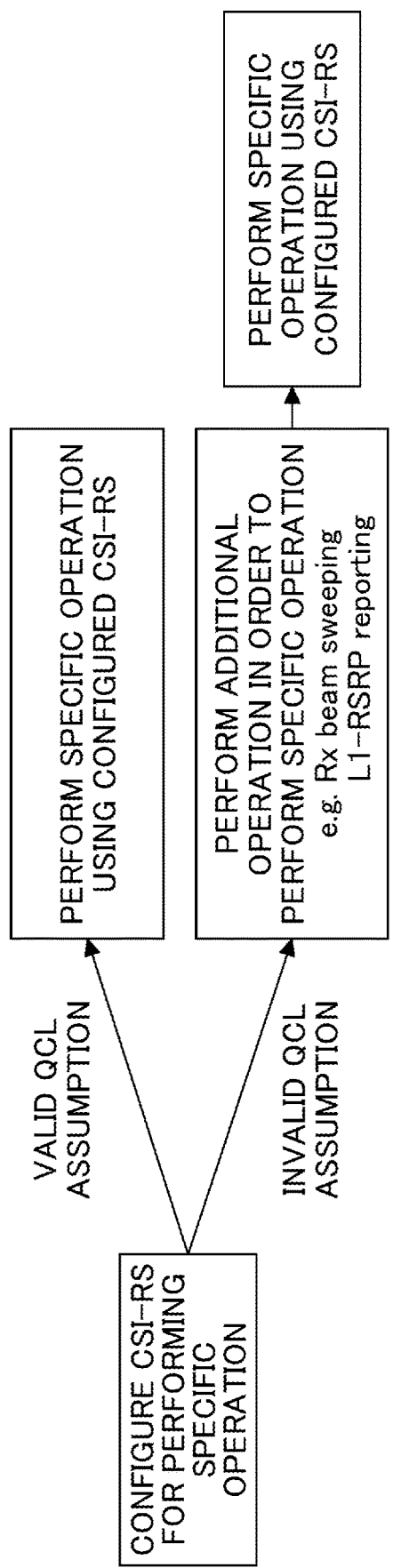
FIG. 11 is a diagram illustrating examples of different operations (2).

FIG. 11 is a diagram illustrating examples of different operations (2). As illustrated in FIG. 11, if a CSI-RS is configured to perform a specific operation, and a QCL relationship assumption is determined to be valid between the configured CSI-RS and the QCL source, a specific operation may be performed using the configured CSI-RS; and if the QCL relationship assumption is determined not to be valid (invalid) between the configured CSI-RS and the QCL source, an additional operation, which is required to perform the specific operation (e.g., reception beam sweeping, L1-RSRP reporting, etc.), may be performed using the configured CSI-RS.

According to an embodiment of the present invention, in a case where QCL assumptions are configured such that different types of determinations may be made with respect to whether a QCL assumption is valid or invalid, with respect to the same measurement operation, any one of the following operations (1), (2), and (3) may be applied.

(1) The measurement operation may be performed using only referenced signals configuring a TCI state containing the valid QCL assumption (the measurement operation may not be performed using referenced signals configuring a TCI state containing the invalid QCL assumption).

(2) If at least one of the configured TCI states contains a valid QCL assumption, all of QCL assumptions in reference signals may be determined to be valid, and the measurement operation may be performed based on the determination that all of the QCL assumptions are valid.

(3) If at least one of the configured TCI states contains an invalid QCL assumption, all of QCL assumptions in reference signals may be determined to be invalid (and the measurement operation need not be performed).

(Device Configuration)

Next, a functional configuration example of the base station 10 and the user device 20 that perform the processing operations described above will be described. The base station 10 and the user device 20 include all the functions described in this embodiment. However, the base station 10 and the user device 20 may include only some of the functions described in this embodiment. The base station 10 and the user device 20 may be collectively referred to as a communication device.

<Base Station 10>

Figure 12:
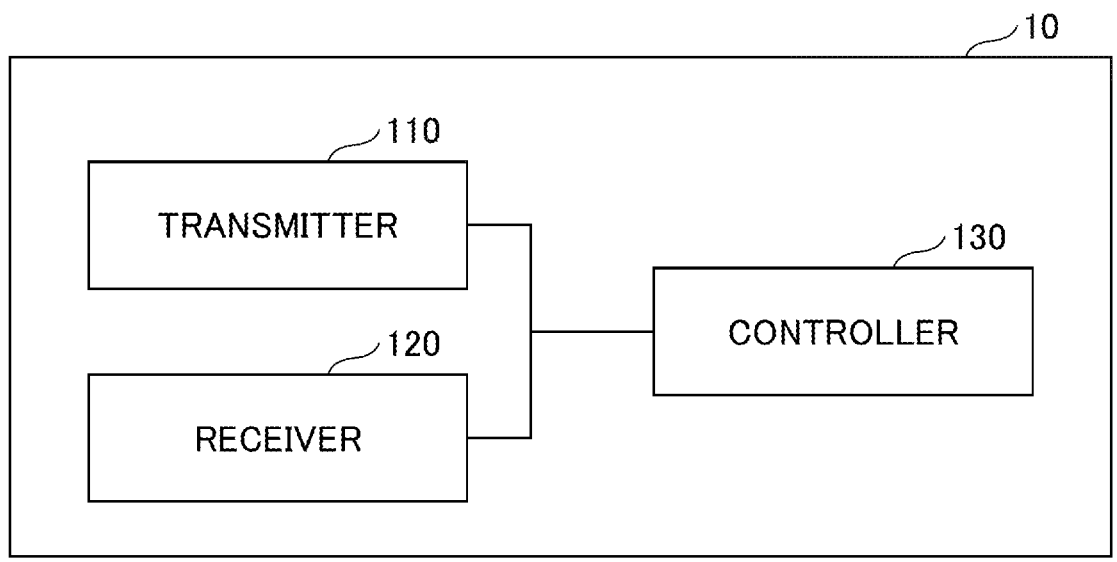
FIG. 12 is a diagram illustrating an example of a functional configuration of a base station 10 according to an embodiment of the present invention.

FIG. 12 is a diagram illustrating an example of a functional configuration of the base station 10. As illustrated in FIG. 12, the base station 10 includes a transmitter 110, a receiver 120, and a controller 130. The functional configuration illustrated in FIG. 12 is merely an example. As long as the operations according to the embodiments can be performed, any functional classifications and names of functional units may be used.

The transmitter 110 generates a transmission signal from transmission data, and wirelessly transmits the transmission signal. The receiver 120 wirelessly receives various types of signals, and obtains higher layer signals from the received physical layer signals. The receiver 120 includes a measuring unit configured to measure a signal to be received and acquire received power and the like.

The controller 130 performs processing relating to communication control of the base station 10. A function of the controller 130 relating to signal transmission may be included in the transmitter 110, and a function of the controller 130 relating to signal reception may be included in the receiver 120.

In the base station 10, the controller 130 calculates an optimum beam based on the quality of each beam reported from the user device 20, and generates information as a TCI state. The information generated as a TCI state indicates that data and/or control signals are transmitted using the calculated beam. The transmitter 110 transmits a signal including a TCI state to the user device 20.

<User Device 20>

Figure 13:
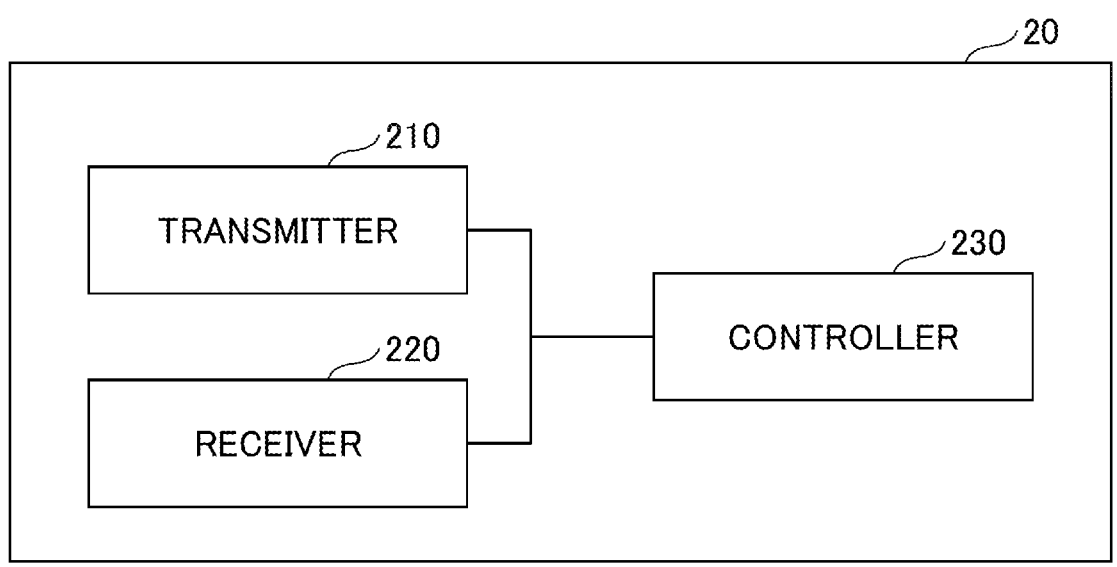
FIG. 13 is a diagram illustrating an example of a functional configuration of a user device 20 according to an embodiment of the present invention.

FIG. 13 is a diagram illustrating an example of a functional configuration of a user device 20. As illustrated in FIG. 13, the user device 20 includes a transmitter 210, a receiver 220, and a controller 230. The functional configuration illustrated in FIG. 13 is merely an example. As long as the operations according to the embodiments can be performed, any functional classifications and names of functional units may be used.

The transmitter 210 includes a function for generating a signal to be transmitted to the base station 10 and transmitting the signal wirelessly. The receiver 220 includes a function for receiving various signals transmitted from the base station 10 and acquiring, for example, information of a higher layer from the received signals. The receiver 220 includes a measuring unit configured to measure a signal to be received and acquire received power.

The controller 230 performs processing relating to communication control of the user device 20. A function of the controller 230 relating to signal transmission may be included in the transmitter 210, and a function of the controller 230 relating to signal reception may be included in the receiver 220.

In the user device 20, the receiver 220 measures the quality of a beam (RSRP: Reference Signal Received Power) using a reference signal transmitted by the resource indicated from the base station 10, and the transmitter 210 transmits the measured quality to the base station 10.

<Hardware Configuration>

The block diagrams (FIGS. 12 and 13) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices. The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, etc.; however, the functions are not limited as such. For example, a function block (constituent unit) that implements the transmission function is referred to as a transmitter or a transmitter. In any case, as described above, the implementation method is not particularly limited.

Figure 14:
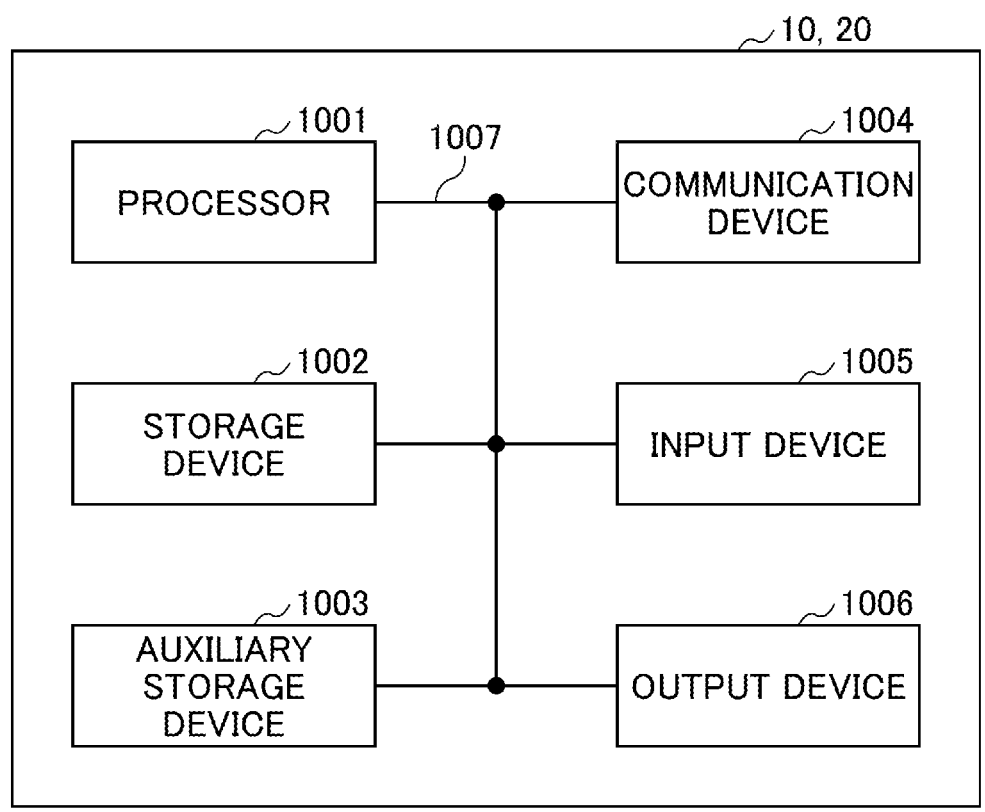
FIG. 14 is a diagram illustrating an example of a hardware configuration of the base station 10 or the user device 20, according to an embodiment of the present invention.

For example, the base station 10 and the user device 20 according to the embodiment of the present disclosure may function as a computer that performs processes of the radio communication method according to the present disclosure. FIG. 14 is a diagram illustrating an example of the hardware configuration of the base station 10 and the user device 20 according to the embodiment of the present disclosure. Each of the base stations 10 and the user devices 20 described above may be formed as a computer device physically including a processor 1001, a storage device 1002, an auxiliary storage device 1003, a communication device 1004, an input device 1005, an output device 1006, a bus 1007, and the like.

Note that in the following description, the term "device" can be read as a circuit, an apparatus, a unit. The hardware configuration of the base station 10 and the user device 20 may be configured to include one or more of the devices illustrated in the FIG. 14 as 1001 to 1006, or may be configured without some of the devices.

The functions of the base station 10 and the user device 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the controller 130 of the base station 10 may be implemented by a control program stored in the storage device 1002 and operating on the processor 1001. Furthermore, the controller 230 of the user device 20 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission device/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD).

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed by using different buses between the devices.

The base station 10 and the user device 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

Overview of Embodiments

At least the following user device and communication method are disclosed herein.

According to an embodiment of the present disclosure, a user device is provided. The user device includes:

a receiver configured to receive, from a base station, a signal containing one or more transmission configuration indication information items; and a controller configured to determine whether an assumption of a QCL (Quasi-Co-Location) relationship between a first signal and a second signal is valid, based on the one or more transmission configuration indication information items, wherein the controller performs an operation with respect to the first signal in accordance with a result of the determination.

According to an embodiment of the present disclosure, a communication method performed by a user device is provided. The communication method includes:
- receiving, from a base station, a signal containing one or more transmission configuration indication information items;
- determining whether an assumption of a QCL (Quasi-Co-Location) relationship between a first signal and a second signal is valid, based on the one or more transmission configuration indication information items; and
- performing an operation with respect to the first signal in accordance with a result of the determination.

According to the above-described configurations, a technology provided in a radio communication system is capable of defining valid QCL assumptions in view of appropriate measurement/reception conditions and load reduction of a user device, and capable of clarifying an operation of the user device according to results of whether the QCL assumptions are valid or invalid. Thus, the disclosed technology may be able to perform network control more appropriately and to maintain stable communication between the base station and the user device without increasing the processing load on the user device.

Supplement of Embodiments

The embodiment of the present invention is described above; however, the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the base station 10 and the user device 20 are described by using the functional block diagrams; however, such devices may be implemented in hardware, software, or combinations thereof. The software to be executed by the processor included in the base station 10 in accordance with the embodiment of the present invention and the software to be executed by the processor included in the user device 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the indication of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RPC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR (new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G, etc.).

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific operation that is supposed to be performed by the user device 20 may be performed by an upper node in some cases. In the network configured with one or a plurality of network nodes including the user device 20, various operations performed for communication with a terminal can be obviously performed by at least one of the user device 20 and any network node (for example, an MME or an S-GW, etc., is considered, but it is not limited thereto) other than the user device 20. The example in which the number of network nodes excluding the user device 20 is one has been described above, but the other network nodes may be a combination of a plurality of other network nodes (for example, an MME and an S-GW).

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Each aspect/embodiment described in the specification may be used alone; may be combined to be used; or may be switched in accordance with execution. Furthermore, indication of predetermined information (e.g., indication of "being X") is not limited to indication that is made explicitly; and the indication may be made implicitly (e.g., indication of the predetermined information is not performed).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," or a "frequency carrier", etc.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station," "radio base station", "base station apparatus", "fixed station", "Node B", "eNodeB (eNB)", "gNodeB (gNB)", "access point", "transmission point", "reception point", "transmission/reception point", "cell," "sector," "sector group", "carrier", "component carrier" can be used interchangeably. The base station is also referred to as a macro cell, a small cell, a Femto cell, a pico cell, etc.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "mobile station (MS: Mobile Station)", "user terminal", "user device or user equipment (UE: User Equipment)", and "terminal", etc., can be used interchangeably.

The mobile station is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, the term "means" in the structure of each of the above-mentioned devices may be substituted with, for example, a "unit", a "circuit", or a "device". When "include", "including", and modifications thereof are used, these terms are intended to be inclusive, similarly to the term "comprising". In addition, the term "or" used in the present disclosure does not mean exclusive OR.

In the present disclosure, if an article is added by translation, such as a, an, the, etc., in English, the present disclosure may include a case where the noun following the article is plural.

The TCI state (Transmission Configuration Indication state) is an example of transmission configuration indication information.

In the present disclosure, the term "A and B are different" may mean "A and B are different from each other". Note that this term may mean "A and B are each different from C". Terms such as "separated", "coupled", etc., may also be interpreted in the same manner as "different".

Although the present disclosure has been described in detail, it is apparent to those skilled in the art that the present disclosure is not limited to the embodiments as described in the present disclosure. The present disclosure can be implemented as modifications and variations without departing from the sprit and scope of the present disclosure as defined in claims. Thus, the description in the present disclosure is intended for exemplary description and does not mean any restriction to the present disclosure.

DESCRIPTION OF REFERENCE SIGNS 110 transmitter
120 receiver
130 controller
210 transmitter
220 receiver
230 controller
1001 processor
1002 memory
1003 storage
1004 communication device
1005 input device
1006 output device

The invention claimed is:

1. A terminal comprising:
a receiver configured to receive, from a base station, a configuration information including one or more transmission configuration indication (TCI) states indicating a quasi-co-location (QCL) relationship between signals; and
a controller configured to assume a QCL relationship between a first signal and a second signal, based on information indicating that two or more signals are associated with each other via the one or more (TCI) states,
wherein, if the information indicating that the two or more signals are associated with each other includes more than four reference signals, the controller is configured to determine that the information indicating that the two or more signals are associated with each other is not valid for assuming a QCL relationship among the more than four reference signals.

2. The terminal according to claim 1, wherein the information indicating that the two or more signals are associated with each other includes synchronization signal block (SSB) information and channel state information-reference signal (CSI-RS) information.

3. The terminal according to claim 1, wherein the controller assumes a QCL relationship between
a demodulation reference signal (DMRS) of a physical downlink control channel (PDCCH) or a DMRS of a physical downlink shared channel (PDSCH), and
the first signal or the second signal.

4. A base station comprising:
a transmitter configured to transmit configuration information including one or more transmission configuration indication (TCI) states indicating a quasi-co-location (QCL) relationship between signals to a terminal,
wherein the information indicating that the two or more signals are associated with each other causes the terminal to assume a QCL relationship between a first signal and a second signal, and
wherein, if the information indicating that the two or more signals are associated with each other includes more than four reference signals, the information indicating that the two or more signals are associated with each other causes the terminal to determine that the information indicating that the two or more signals are associated with each other is not valid for assuming a QCL relationship among the more than four reference signals.

5. A system comprising:
a base station including
a transmitter configured to transmit configuration information including one or more transmission configuration indication (TCI) states indicating a quasi-co-location (QCL) relationship between signals to a terminal; and
a terminal including
a receiver configured to receive the configuration information from the base station, and
a controller configured to assume a QCL relationship between a first signal and a second signal, based on information indicating that two or more signals are associated with each other via the one or more (TCI) states,
wherein, if the information indicating that the two or more signals are associated with each other includes more than four reference signals, the controller is configured to determine that the information indicating that the two or more signals are associated with each other is not valid for assuming a QCL relationship among the more than four reference signals.

6. A communication method of a terminal, the method comprising:
receiving, from a base station, a configuration information including one or more transmission configuration indication (TCI) states indicating a quasi-co-location (QCL) relationship between signals; and
assuming a QCL relationship between a first signal and a second signal, based on information indicating that two or more signals are associated with each other via the one or more (TCI) states,
wherein, if the information indicating that the two or more signals are associated with each other includes more than four reference signals, the communication method determines that the information indicating that the two or more signals are associated with each other is not valid for assuming a QCL relationship among the more than four reference signals.

* * * * *